(No Model.)
J. R. WILLIAMS.
WHEELED DIRT SCRAPER.
No. 286,246. Patented Oct. 9, 1883.
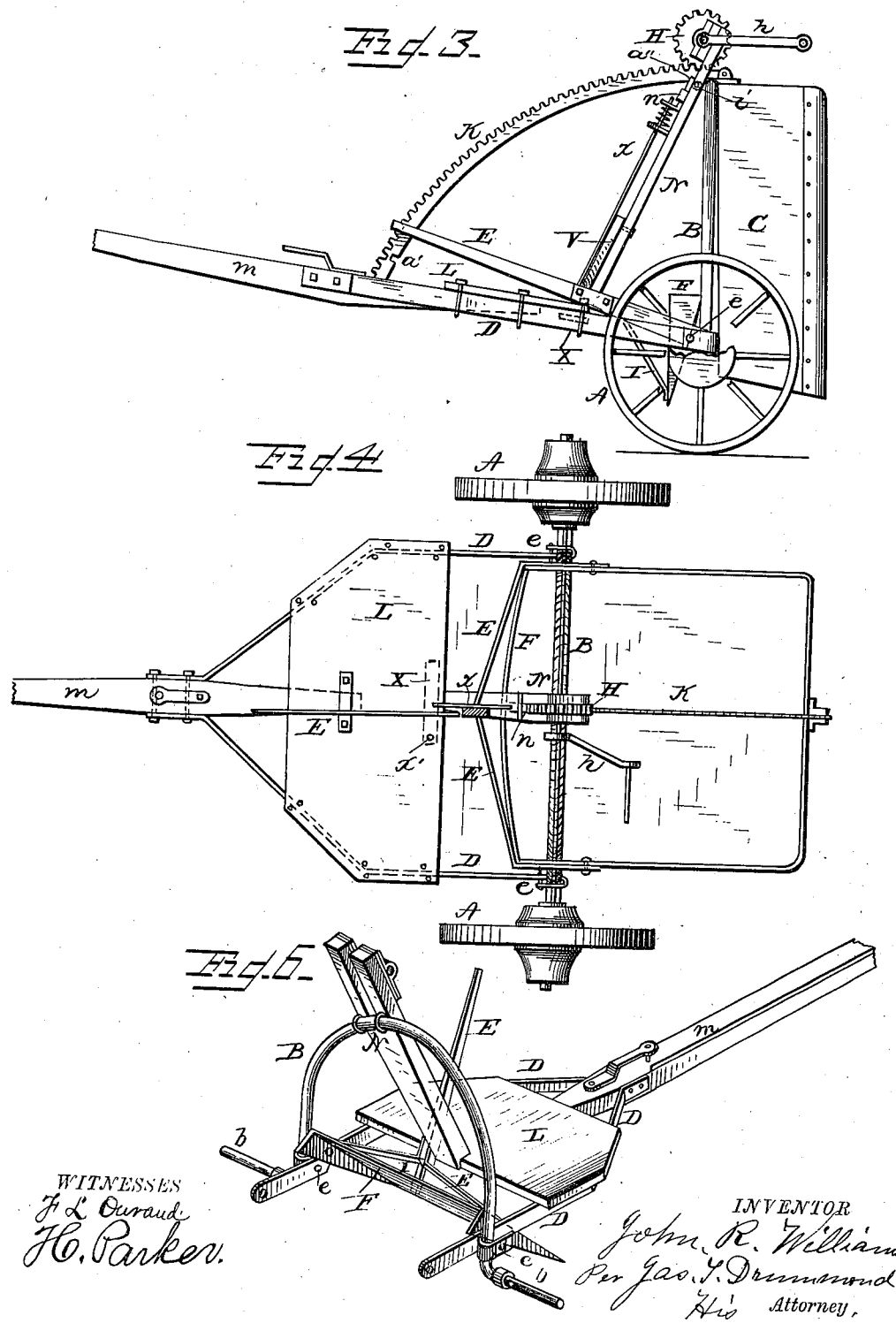
WITNESSES
F. L. Ouraud.
H. Parker.
INVENTOR
John R. Williams
Per Jas. T. Drummond
His Attorney.

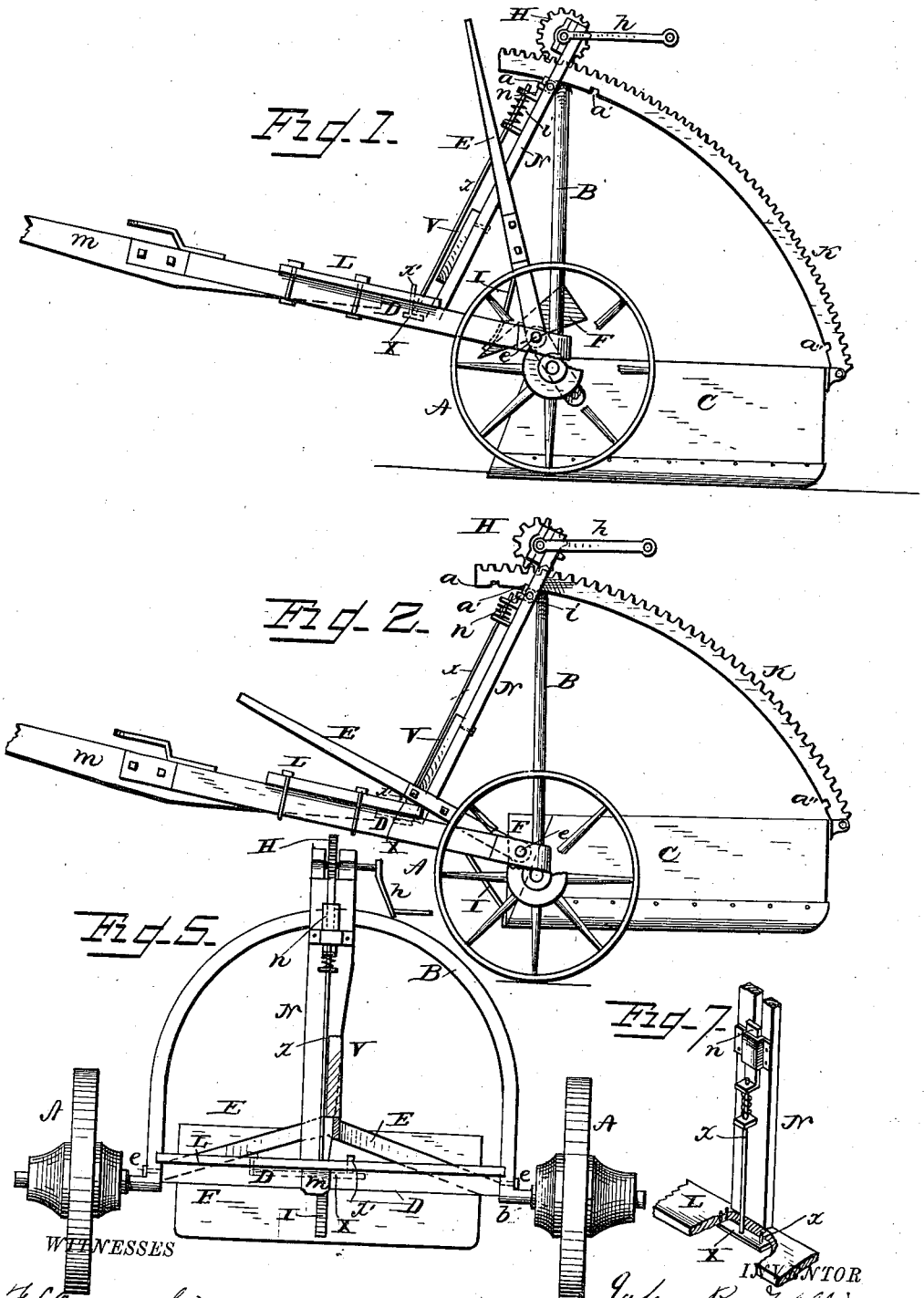

UNITED STATES PATENT OFFICE.

JOHN R. WILLIAMS, OF MOUNT PLEASANT, IOWA.

WHEELED DIRT-SCRAPER.

SPECIFICATION forming part of Letters Patent No. 286,246, dated October 9, 1883.

Application filed March 14, 1883. (No model.)

*To all whom it may concern:*

Be it known that I, JOHN R. WILLIAMS, a citizen of the United States, residing at Mount Pleasant, in the county of Henry and State of Iowa, have invented certain new and useful Improvements in Wheeled Dirt-Scrapers, of which the following is a specification.

My invention relates to improvements in that class of dirt-scrapers having an adjustable scoop mounted on traveling wheels, so that it may be lowered for filling with dirt, and when thus loaded may be elevated by the attendant, so as to have the scoop with its load carried free of the ground while transporting the dirt to any desired destination, where it may be easily dumped by the attendant, which, as well as all other manipulations of said scoop, is accomplished by said attendant without dismounting from his riding-place on the platform of the machine.

The object of my invention is to provide an improved wheeled dirt-scraper having mechanism better adapted (than heretofore known) to the wants of lowering the scoop of a dirt-scraper from its traveling position, mounted on wheels, to that required for loading, for holding said scoop in a proper position for filling when thus lowered, for raising said loaded scoop to an elevated traveling position, and, simultaneously therewith, for closing the front end of the same, so as to retain dirt to its fullest capacity, and for manipulating or raising the rear end of said scoop in dumping its load, and vice versa, all of which being so constructed as to be easily managed by one attendant, while he also handles the team, thereby greatly saving in the cost of hands usually attending scrapers.

My invention consists in the mechanism shown by the accompanying drawings and this specification for the accomplishment of the above-named objects, which drawings also constitute part of this specification. Said invention is also more particularly pointed out in the claims hereunto attached.

Similar reference-letters pertaining to the drawings indicate like parts throughout the different figures, and dotted lines parts hidden from view of said drawings.

Figure 1 is a side elevation of the whole machine embodying my invention, having the scoop lowered in position for being filled with dirt. Parts of the wheel, however, are removed for the purpose of showing more clearly other parts of the working mechanism. Fig. 2 is a similar view of the same with the scoop raised and the forward end closed in position for traveling with a load. Fig. 3 is a similar view with the rear of the scoop raised so that it occupies a vertical position, and having the forward end-gate opened, in position assumed after dumping and while returning empty. Fig. 4 is a plan view, showing the machine in the position occupied when the scoop is traveling with a load, having the forward end-gate closed. Fig. 5 is an end elevation viewed from before when in the last-named position. Fig. 6 is a perspective of part of the tongue, the tongue-bars, the attendant's riding-platform, the axle of the machine, the operating-lever, and the supporting-post for the scoop-operating pinion, all as combined; and Fig. 7 is a perspective of a latch for holding the adjusting-rack used for manipulating the rear end of the scoop in its several required fixed positions, showing also an operating-treadle and connecting-rod for working said latch.

A designates the carrying-wheels of the machine, which wheels rotate loosely on the spindles $b$ of the arched axle B.

C is the scoop, preferably made of sheet-steel.

D are tongue-bars, which are rigidly fastened to the axle B by bending them laterally outward and forward, thereby forming hooks or loops closely enveloping three sides of said axle immediately above the spindles, and are firmly secured thereto by means of pins or bolts $e$, which pins also serve as wrists or fulcrums for the operating-lever E. Said pins $e$ pass through both of the folds of said bars D, so as to press tightly against the axle, and are fastened by means of screw-taps on their outer ends, so as to rigidly connect said parts together. Said pins are also provided with wrists on their inner ends, serving as pivots or fulcrums for the bifurcated lever E, said lever having its forks diverging from a common lever-handle, are again bent inward, passing rearward outside of the forward end of the scoop, and have their rear extremities bent slightly upward from their pivotal points; and said extreme ends are pivoted to the sides of the scoop, by which means said lever serves to support and manipulate the forward end of said scoop. Between the forks of said lever E is also fastened a forward end-gate, F, which end-gate closes the forward end of the scoop automatically in the process of lowering said lever and of raising said scoop after filling, so as to retain dirt to its fullest capacity. The lever E is also provided with a spring-arm, I, which is deflected downward from the junction of its forks with the handle of said lever, which spring-arm is made to press against the lower edge of the gate F, so as to cause it to close tightly against the forward end of the scoop by the downward movement of said handle, and by means of the spring of said arm I proper elasticity is given said parts, so as to cause the gate to adjust properly to the end of the scoop in harmony with its movements while being raised.

A platform, L, is provided, which rests on and is fastened to the tongue-bars D. Said platform serves as the riding-place upon which the attendant stands, and where he alone manipulates and manages the machine in all its operations, and also, at the same time, manages the team. Said platform also serves as a stay to secure the hind end of the tongue m by said tongue being fastened to it. It also stays and strengthens the tongue-bars D by their being fastened to it at different places. To said platform L is also fastened an upright rearward-leaning post, N, which post leans against and is fastened to the middle of the arched axle B, serving as a brace to the same. In the upper end of said post is made a vertical fore-and-aft slot, in which a cogged pinion, H, is placed, it being hung on a shaft, and said shaft pivoted in suitable boxes attached to said post. The shaft of said pinion is provided with a hand-crank, $h$, by which it is operated by the attendant. A segmental toothed rack, K, having one end fastened by a pivotal connection to a lug attached to the hind end of the scoop, and the other end passing through the slot in the post N, under the pinion H, with its teeth gearing with said pinion, by which it is operated, is the means of raising and lowering the hind-end of the scoop by the attendant turning said pinion. Said mechanism also serves to hold the scoop firmly while filling, so that it will not prematurely dump by its edge striking hard substances during said process. A small roller, $i$, may be placed in the slot in the post N, under the rack K, as a rolling support to hold said rack properly in gear with said pinion and to prevent the friction, that would otherwise be caused by the rubbing of said rack during its adjustments. Said rack is also provided with niches $a$, $a'$, and $a''$ in its under edge, into which a latch, $n$, takes, by which means it is held in the different stationary positions required to hold the scoop in its several required fixed positions. Said latch $n$ consists of a bar or bolt made to slide vertically in a casing attached to the front side and upper end of the post N, immediately under the manipulating-rack K, and is provided with a spring to operate it automatically in its upward movement, causing it to take into the niches $a$, $a'$, and $a''$, respectively, as the reciprocal movements of said rack adjusts the scoop to the required position. It is unlatched by means of the attendant pressing his foot against an upward-extending operating-pin, $x'$, attached to a treadle, X, which treadle, having a rod, $x$, connecting it with said latch, disengages it from said niches. Said treadle is hung on a pivot attached to and underneath the platform L, with the connecting-rod $x$, and the operating-pin $x'$ passing upward from it through apertures in said platform.

To the front side, and near the lower end of the post N, is also hung, by a pivot at its upper end a latch, V, it being so arranged that its lower end will yield laterally to the pressure of the lever E in its downward movement past it in raising a load, and after said lever shall have passed below its lower end it will automatically, by its own gravity, swing back over said lever, so as to hold it down, thereby supporting the forward end of the scoop in an elevated position. Said lever is again freed for lowering the scoop by the attendant pressing said latch sidewise from over it.

As a recapitulation of the operation of the above-described mechanism, for the purpose of making it more plain, the attendant stands on the platform L, where he can largely balance the machine, whether loaded or empty, by changing his position suitably to the several requirements. He raises the forward end of the scoop, and simultaneously therewith closes the forward end-gate by a downward pressure or movement of the lever E, and the said lever is held in said position by the latch V automatically swinging over it. The hind end of said scoop is raised for traveling with a load by said attendant taking hold of the crank $h$, and, with a foot, pressing downward on the pin $x'$, so as to free the latch $n$ from the niche $a$, and at the same time rotate the pinion H, so as to lift on the rack K, until said latch $n$ takes into the niche $a'$, thereby fastening it in said position, which is suitable for traveling with a load. For dumping the load, the attendant again takes hold of said crank and presses downward on said treadle-pin, thereby freeing the latch $n$ from the niche $a'$, and again rotates said pinion until the reciprocal movement of said rack K has raised the hind end of the scoop to the position shown at Fig. 3, when the latch takes into the niche $a''$, thereby securing it in said position, which is that usually occupied while traveling empty. The scoop is lowered for filling by disengaging the latch $n$ from the niches in the rack K and by reverse movements of the other mechanism described, and when thus lowered the latch $n$ takes into the niche $a$, by which means the scoop is held firmly while being filled,

Having thus fully described my invention, so as to enable others skilled in the art to which it appertains to understand the same, what I claim as new, and desire to secure by Letters Patent, is—

1. In combination with the carrying-wheels and the tongue-bars of a dirt-scraper, an arched axle, B, with the stationary post N, said axle being rigidly secured in a vertical position to said post, thereby bracing each other and forming a support for the lifting mechanism for manipulating the rear end of the scoop, substantially as herein shown, for the purposes specified.

2. In combination with tongue-bars of a wheeled dirt-scraper, rigidly fastened at their forward ends to the tongue of the machine and at their hind ends to the vertical sections of an arched axle, the wrists or pins $e$, constituting fulcrums for the operating-lever, and thereby supports for the same, located forward of the axle, for the purpose of suspending the consequent weight from points forward of the bearings in the wheels, substantially as herein shown and described.

3. In combination with a forward-acting bifurcated lever for supporting and manipulating the forward end of a dirt-scoop, and in combination with said scoop, an end-gate for closing its forward end, it being arranged and fastened between the forks of said lever, so as to automatically act in harmony with the simultaneous movements of said lever and scoop, substantially as herein shown, for the purposes specified.

4. In combination with an operating-lever for manipulating the forward end of the scoop of a wheeled dirt-scraper, and with said scoop, an end-gate mounted upon said lever, having triangular end flanges extending rearward at right angles with its chief plane, so that when closed it will fit the sloping forward ends of the sides of the scoop, and thereby enlarge the capacity of the same, substantially as herein shown, for the purposes specified.

5. In combination with an attendant's riding-platform, mounted on draft-bars of a wheeled dirt-scraper forward of the axle of the machine, and a vertically-stationary arched axle, a supporting-post, N, fastened at its lower end to said platform and near its upper end to said axle, serving as a brace or stay to the same, it also being provided with a fore-and-aft vertical slot in its upper end, in which an operating cogged pinion works, and through which a curved lifting gear-rack plays reciprocally in manipulating the rear end of the scoop, serving also as a bearing for said pinion and support for said rack, substantially as shown, for the purposes specified.

6. In combination with the supporting-post N and the scoop of a wheeled dirt-scraper, the lifting mechanism for manipulating the rear end of said scoop, consisting of a cogged gear-pinion, H, hung in a slot in the upper end of said post, and provided with a hand-crank, $h$, and also of a curved cog-gear rack, K, it having one end pivoted to a lug attached to the rear of said scoop, and the other end passing through said slot under and gearing with said pinion, said lifting-rack also being provided with niches $a$, $a'$, and $a''$ in its under edge, for securing the scoop in its several fixed positions by means of an automatic-acting latch taking into said niches, all substantially as herein shown, for the purposes specified.

7. In combination with a supporting-post, N, platform L, and lifting-rack K, the latching mechanism for holding said rack, and thereby the scoop in its several fixed positions, consisting of the latch $n$, treadle X, having an upward-extending operating-pin, $x'$, and the connecting-rod $x$, all arranged and combined substantially as herein shown, for the purposes specified.

8. The combination of the wheels A, arched axle B, tongue $m$, tongue-bars D, wrists or pivots $e$, lever E, scoop C, end-gate F, platform L, post N, pinion H, crank $h$, rack K, latch $n$, treadle X, connecting-rod $x$, and catch or latch V, all constructed and arranged substantially as herein shown, for the purposes specified.

JOHN R. WILLIAMS.

Witnesses:
L. A. PALMER,
T. J. SWEENY.